US012612102B2

(12) United States Patent
Oya et al.

(10) Patent No.: US 12,612,102 B2
(45) Date of Patent: Apr. 28, 2026

(54) CONTROLLING STEERING SENSITIVITY FOR ALTERNATIVE STEERING OPTIONS

(71) Applicant: JTEKT CORPORATION, Kariya (JP)

(72) Inventors: Toshiaki Oya, Sakai (JP); Yoshinobu Shimizu, Sakai (JP)

(73) Assignee: JTEKT CORPORATION, Kariya (JP)

( * ) Notice: Subject to any disclaimer, the term of this patent is extended or adjusted under 35 U.S.C. 154(b) by 105 days.

(21) Appl. No.: 18/701,658

(22) PCT Filed: Nov. 17, 2021

(86) PCT No.: PCT/JP2021/042242
§ 371 (c)(1),
(2) Date: May 24, 2024

(87) PCT Pub. No.: WO2023/089695
PCT Pub. Date: May 25, 2023

(65) Prior Publication Data
US 2024/0416995 A1 Dec. 19, 2024

(51) Int. Cl.
B62D 6/00 (2006.01)
B62D 5/04 (2006.01)

(52) U.S. Cl.
CPC ............ B62D 6/002 (2013.01); B62D 5/0421 (2013.01); B62D 5/046 (2013.01)

(58) Field of Classification Search
CPC ....... B62D 6/002; B62D 5/0421; B62D 5/046
See application file for complete search history.

(56) References Cited

U.S. PATENT DOCUMENTS

| | | | |
|---|---|---|---|
| 5,086,870 A | 2/1992 | Bolduc | |
| 2011/0224872 A1* | 9/2011 | Reed .................... | B62D 6/002 |
| | | | 701/41 |
| 2021/0053613 A1 | 2/2021 | Kodera et al. | |

FOREIGN PATENT DOCUMENTS

| | | |
|---|---|---|
| JP | S62-146501 A | 6/1987 |
| JP | H08-034353 A | 2/1996 |
| JP | 2003-162214 A | 6/2003 |
| JP | 2003-165460 A | 6/2003 |

(Continued)

OTHER PUBLICATIONS

Feb. 1, 2022 International Search Report issued in International Patent Application No. PCT/JP2021/042242.

*Primary Examiner* — Gonzalo Laguarda
(74) *Attorney, Agent, or Firm* — Oliff PLC

(57) ABSTRACT

A steering control device includes a target steering corresponding value computing unit configured to compute a target steering corresponding value. The target steering corresponding value computing unit is configured to execute low sensitivity determination processing for determining whether or not a low sensitivity condition for reducing an amount of change in the steered angle with respect to an amount of change in an amount of operation of an operating lever is satisfied, normal computation processing for computing the target steering corresponding value based on the amount of operation when the low sensitivity condition is not satisfied, and low sensitivity computation processing for computing, based on the amount of operation, the target steering corresponding value having a smaller absolute value than the target steering corresponding value computed by the normal computation processing, when the low sensitivity condition is satisfied.

13 Claims, 6 Drawing Sheets

(56)         References Cited

FOREIGN PATENT DOCUMENTS

| JP | 2004-034870 | A | 2/2004 |
| JP | 2010-123064 | A | 6/2010 |
| JP | 2010-163091 | A | 7/2010 |
| JP | 2021-030837 | A | 3/2021 |

* cited by examiner

CONTROLLING STEERING SENSITIVITY FOR ALTERNATIVE STEERING OPTIONS

TECHNICAL FIELD

The present disclosure relates to a steering control device and a steering control method.

BACKGROUND ART

Conventionally, there is a steer-by-wire steering device in which a power transmission path between an operation unit to which a steering wheel is linked and a steering unit that steers steered wheels is separated. For example, as described in Patent Document 1, a steering control device that controls such a steering device changes an angle ratio of a steered angle of the steered wheels with respect to a steering angle of the steering wheel, in accordance with traveling conditions of a vehicle.

Patent Document 2 discloses an arrangement in which a joystick is employed as an operating member operated by a driver in addition to or instead of a steering wheel. When the joystick is the operating member, an amount of operation necessary to turn the steered wheels can be reduced as compared to when the steering wheel is the operating member, and thereby convenience can be improved for the driver.

RELATED ART DOCUMENTS

Patent Documents

Patent Document 1: Japanese Unexamined Patent Application Publication No. 2021-30837 (JP 2021-30837 A)
Patent Document 2: Japanese Unexamined Patent Application Publication No. 8-34353 (JP 8-34353 A)

SUMMARY OF THE INVENTION

Problem to be Solved by the Invention

When the joystick is the operating member as described above, reducing the amount of operation necessary to steer the steered wheels increases the amount of change in the steered angle relative to the amount of change in the amount of operation. That is to say, even when the amount of operation of the joystick is small, the steered angle of the steered wheels changes greatly. Accordingly, operations to finely adjust the steered angle of the steered wheels are difficult.

Means for Solving the Problem

One aspect of the present disclosure provides a steering control device that controls a steering device of a vehicle. The steering device has a structure in which a power transmission path between an operation unit having an operating lever and a steering unit configured to steer a steered wheel is separated. The steering control device includes a target steering corresponding value computing unit configured to compute a target steering corresponding value that is a target value of a convertible value that can be converted into a steered angle of the steered wheel, and a control signal generating unit configured to generate a control signal for actuation of the steering unit, based on the target steering corresponding value. The target steering corresponding value computing unit is configured to execute low sensitivity determination processing for determining whether or not a low sensitivity condition for reducing an amount of change in the steered angle with respect to an amount of change in an amount of operation of the operating lever is satisfied, normal computation processing for computing the target steering corresponding value based on the amount of operation when the low sensitivity condition is not satisfied, and low sensitivity computation processing for computing, based on the amount of operation, the target steering corresponding value having a smaller absolute value than the target steering corresponding value computed by the normal computation processing, when the low sensitivity condition is satisfied.

Another aspect of the present disclosure provides a steering control method for controlling a steering device of a vehicle. The steering device has a structure in which a power transmission path between an operation unit having an operating lever and a steering unit configured to steer a steered wheel is separated. The steering control method includes computing a target steering corresponding value that is a target value of a convertible value that can be converted into a steered angle of the steered wheel, and generating a control signal for actuation of the steering unit, based on the target steering corresponding value, in which computing the target steering corresponding value includes executing low sensitivity determination processing for determining whether or not a low sensitivity condition for reducing an amount of change in the steered angle with respect to an amount of change in an amount of operation of the operating lever is satisfied, normal computation processing for computing the target steering corresponding value based on the amount of operation when the low sensitivity condition is not satisfied, and low sensitivity computation processing for computing, based on the amount of operation, the target steering corresponding value having a smaller absolute value than the target steering corresponding value computed by the normal computation processing, when the low sensitivity condition is satisfied.

MODES FOR CARRYING OUT THE INVENTION

An embodiment of a steering control device will be described below with reference to the drawings.

(Overall Configuration)

Figure 1:
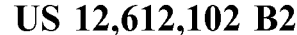
FIG. 1 is a schematic configuration diagram of a steering device and a steering control device that controls the steering device according to an embodiment.

As illustrated in FIG. 1, a steering control device 1 controls a steer-by-wire type steering device 2. The steering device 2 changes a direction of travel of a vehicle by steering steered wheels 3, in accordance with operations performed by a driver. The steering device 2 includes an operation unit 4 that is operated by the driver, and a steering unit 5 that steers the steered wheels 3. The steering device 2 has a structure in which a power transmission path between the operation unit 4 and the steering unit 5 is mechanically separated.

The operation unit 4 includes an operating lever 11 that is operated by the driver, and a base 12 that tiltably supports the operating lever 11. The base 12 according to the present embodiment supports the operating lever 11 so as to be tiltable in a lateral direction of the vehicle, i.e., in a right-left direction, and the operating lever 11 is tilted in the right-left direction by operations performed by the driver. That is to say, an amount of operation by the driver is expressed by an inclination angle of the operating lever 11 (hereinafter referred to as lever inclination angle θ1). In another embodiment, the base 12 may support the operating lever 11 so as to be tiltable in a front-rear direction of the vehicle.

In the illustrated example, the operation unit 4 includes an inclination angle sensor 13 that detects the lever inclination angle θ1. The lever inclination angle θ1 is detected as a positive value when the operating lever 11 is tilted to a right direction, and as a negative value when the operating lever 11 is tilted to a left direction, but the opposite may be used.

Further, the operation unit 4 includes a sensitivity switch 14 that is operated by the driver. The sensitivity switch 14 is used to change an angle ratio α of a steered angle θi of the steered wheels 3 as to the lever inclination angle θ1 of the operating lever 11 according to intent of the driver, as will be described later. The angle ratio α is a value obtained by dividing the steered angle θi by the lever inclination angle θ1 (α=θi/θ1). The sensitivity switch 14 outputs a switch signal Ss indicating an on/off state of the sensitivity switch 14 to the steering control device 1. The sensitivity switch 14 according to the present embodiment is a type of switch that is switched to a continuously on or off state when pressed by the driver once. The sensitivity switch 14 is disposed, for example, on the operating lever 11, but is not limited thereto, and may be disposed at any position that can be operated by the driver, such as on the base 12, near a driver's seat, or the like.

The steering unit 5 includes a pinion shaft 21, a rack shaft 22 linked to the pinion shaft 21, a rack housing 23 that accommodates the rack shaft 22 so as to be capable of reciprocating motion, and a rack and pinion mechanism 24 having the pinion shaft 21 and the rack shaft 22. The rack and pinion mechanism 24 is made up by meshing pinion teeth 21a formed on the pinion shaft 21 with rack teeth 22a formed on the rack shaft 22. Thus, the pinion shaft 21 turns in accordance with the reciprocating motion of the rack shaft 22. Tie rods 26 are linked to both ends of the rack shaft 22 via ball joints 25. Distal ends of the tie rods 26 are linked to knuckles, omitted from illustration, with the steered wheels 3 assembled thereto.

The steering unit 5 further includes a steering actuator 31 that applies a steering force, which is a force for steering the steered wheels 3, to the rack shaft 22. In the illustrated example, the steering actuator 31 includes a steering motor 32 and a power transmission mechanism 33 that transmits torque of the steering motor 32 to the rack shaft 22. The power transmission mechanism 33 includes a belt mechanism 34 and a ball screw mechanism 35. The steering actuator 31 transmits rotations of the steering motor 32 to the ball screw mechanism 35 via the belt mechanism 34, and the ball screw mechanism 35 performs conversion thereof into reciprocating motion of the rack shaft 22, thereby applying steering force to the steered wheels 3.

In the steering device 2 configured as described above, the steering force is applied from the steering actuator 31, in accordance with operations performed by the driver on the operating lever 11. As a result, the rack shaft 22 exhibits reciprocating motion, and the steered angle θi of the steered wheels 3 is changed. That is to say, the steering actuator 31 steers the steered wheels 3 in accordance with operations performed by the driver.

The steering control device 1 is connected to the steering motor 32 and controls actuation of the steering motor 32. Also, the steering control device 1 is connected to a notification unit 37 and controls actuation of the notification unit 37. The notification unit 37 may be any device that outputs a physical quantity that the driver can recognize by the five senses, such as a display panel, a speaker, or the like.

Detection results from various types of sensors are input to the steering control device 1. The various types of sensors include, for example, the inclination angle sensor 13, a vehicle speed sensor 41, a rotational angle sensor 42, and an acceleration sensor 43. The vehicle speed sensor 41 detects a vehicle speed V that is a traveling speed of the vehicle. The rotational angle sensor 42 detects a rotational angle θt of a rotation shaft of the steering motor 32 as a relative angle, within a range of 360°. The acceleration sensor 43 according to the present embodiment detects lateral acceleration GY and up-down acceleration GZ of the vehicle. The up-down acceleration GZ is detected as a positive value for upward-direction acceleration and a negative value for downward-direction acceleration, but the opposite may be used. In another embodiment, the acceleration sensor may detect front-rear acceleration of the vehicle in addition to the lateral acceleration GY and the up-down acceleration GZ. Also, in another embodiment, a lateral acceleration sensor that detects the lateral acceleration GY, and an up-down acceleration sensor that detects the up-down acceleration GZ, may be separately connected to the steering control device 1.

The switch signal Ss from the sensitivity switch 14 is input to the steering control device 1. Further, a position signal Sp is input to the steering control device 1 from a position sensor 44 that detects a shift position of a shift lever that is omitted from illustration. The shift positions include, for example, a parking position P for when parking the vehicle, a reverse position R for when driving the vehicle in reverse, and a drive position D for when driving the vehicle forward. Also, the steering control device 1 controls the actuation of the steering motor 32 based on state variables that are input.

(Steering Control Device 1)

Figure 2:
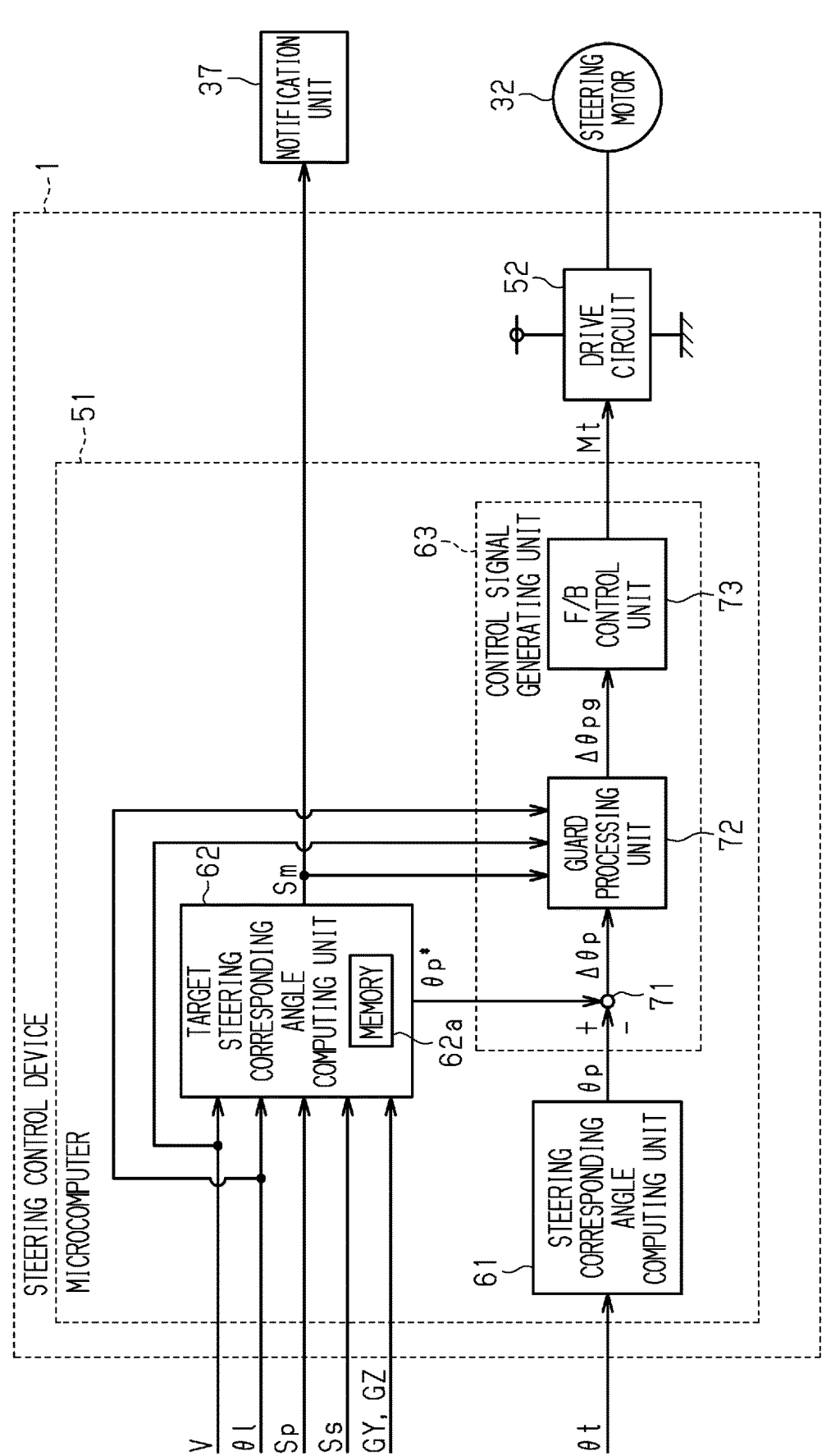
FIG. 2 is a block diagram of the steering control device in FIG. 1.

The configuration of the steering control device 1 will be described in detail below. As illustrated in FIG. 2, the steering control device 1 includes a microcomputer 51 that outputs a control signal Mt, and a drive circuit 52 that supplies electric power to the steering motor 32 based on the control signal Mt.

The microcomputer 51, which is a processing circuit, can be made up of (1) one or more processors that operate in accordance with a computer program (software), (2) one or more dedicated hardware circuits, such as an application-specific integrated circuit (ASIC) that executes at least part of processing out of various types of processing, or the like, or (3) a combination thereof. The processor includes a CPU and memory such as RAM, ROM, and so forth, and the memory stores program codes or commands configured to cause the CPU to execute processing. The memory, namely a non-transitory computer-readable medium, includes any available media that can be accessed by a general-purpose or dedicated computer. Various types of control by the microcomputer 51 are executed by the CPU executing programs stored in the memory at a predetermined computation cycle.

A typical PWM inverter having a plurality of switching elements, such as FETs, IGBTs, and so forth, for example, is employed as the drive circuit 52. The control signal Mt is a gate on/off signal that defines the on/off state of each switching element.

By outputting the control signal Mt from the microcomputer 51 to the drive circuit 52, electric power corresponding to the control signal Mt is supplied from an in-vehicle power supply to the steering motor 32. Thus, the steering motor 32 rotates, and the steering force is applied to the steered wheels 3, as described above. In this way, the steering control device 1 controls motor torque generated by the steering motor 32, by supplying electric power to the steering motor 32, thereby causing the steered wheels 3 to be steered.

(Microcomputer 51)

A configuration of the microcomputer 51 will be described in detail below. The microcomputer 51 outputs the control signal Mt by the following control blocks executing computation processing at every predetermined computation cycle. The microcomputer 51 receives input of the vehicle speed V, the lever inclination angle θ1, the rotational angle θt, the lateral acceleration GY, the up-down acceleration GZ, the switch signal Ss, and the position signal Sp. The microcomputer 51 generates and outputs the control signal Mt based on these state variables.

Specifically, the microcomputer 51 includes a steering corresponding angle computing unit 61 that computes a steering corresponding angle θp, a target steering corresponding angle computing unit 62 that computes a target steering corresponding angle θp* that is a target value of the steering corresponding angle θp, and a control signal generating unit 63 that generates the control signal Mt.

The rotational angle θt of the steering motor 32 is input to the steering corresponding angle computing unit 61. The steering corresponding angle computing unit 61 computes an integrated angle by counting the number of rotations of the steering motor 32 from a midpoint thereof, for example, and integrating the rotational angle θt with the midpoint as zero degrees. The steering corresponding angle computing unit 61 then multiplies this integrated angle by a conversion coefficient based on a reduction ratio of the belt mechanism 34, a lead of the ball screw mechanism 35, and a rotational speed ratio of the rack and pinion mechanism 24, whereby the steering corresponding angle θp is computed. That is to say, the steering corresponding angle θp is equivalent to a pinion angle that is the rotational angle of the pinion shaft 21, and the midpoint is the rotational angle of the pinion shaft 21 when the vehicle is traveling straight forward. As described above, the pinion shaft 21 turns in accordance with the reciprocating motion of the rack shaft 22, and accordingly, the rotational angle of the pinion shaft 21, i.e., the steering corresponding angle θp is equivalent to a steering corresponding value that is an actual value of a convertible value that can be converted into the steered angle θi of the steered wheels 3, and the steering corresponding angle computing unit 61 is equivalent to a steering corresponding value computing unit. The steering corresponding angle θp computed by the steering corresponding angle computing unit 61 is output to the control signal generating unit 63.

The vehicle speed V, the lever inclination angle θ1, the lateral acceleration GY, the up-down acceleration GZ, the switch signal Ss, and the position signal Sp are input to the target steering corresponding angle computing unit 62. The target steering corresponding angle computing unit 62 computes the target steering corresponding angle θp*, which is a target value of the steering corresponding angle θp, based on these state variables. That is to say, the target steering corresponding angle θp* is equivalent to a target steering corresponding value that is a target value of convertible values that can be converted into the steered angle θi of the steered wheels 3, and the target steering corresponding angle computing unit 62 is equivalent to a target steering corresponding value computing unit. Computation processing of the target steering corresponding angle θp* by the target steering corresponding angle computing unit 62 will be described later. The target steering corresponding angle θp* is output to the control signal generating unit 63.

The control signal generating unit 63 receives input of the vehicle speed V, the lever inclination angle θ1, the steering corresponding angle θp, the target steering corresponding angle θp*, and a mode signal Sm, which will be described later. The control signal generating unit 63 generates the control signal Mt based on these state variables.

Specifically, the control signal generating unit 63 includes a subtractor 71, a guard processing unit 72, and a feedback control unit 73. Note that hereinafter, the term feedback may be written as "F/B".

The subtractor 71 receives input of the steering corresponding angle θp and the target steering corresponding angle θp*. The subtractor 71 computes a difference Δθp by subtracting the steering corresponding angle θp from the target steering corresponding angle θp*. The difference Δθp is output to the guard processing unit 72.

In addition to the difference Δθp, the vehicle speed V, the lever inclination angle θ1, and the mode signal Sm are input to the guard processing unit 72. The guard processing unit 72 computes a difference Δθpg, which limits the difference 40p to no greater than a difference upper-limit value Δθlim, based on these state variables. The difference upper-limit value Δθlim is a value set in accordance with an upper-limit speed of the steering speed of the steered wheels 3. Guard processing of the difference Δθp by the guard processing unit 72 will be described later. The difference Δθpg following the guard processing is output to the F/B control unit 73.

The difference Δθpg following guard processing is input to the F/B control unit 73. The F/B control unit 73 computes a target steering torque by executing F/B computation based on the difference Δθpg. As an example, PID control computation is employed for the F/B computation, but this is not restrictive, and PI control computation or the like may be used. The F/B control unit 73 then uses an optional known technology to generate the control signal Mt that causes the steering motor 32 to generate the target steering torque.

As described above, the difference Δθpg used in the F/B computation is limited to no greater than the difference upper-limit value Δθlim in accordance with the upper-limit speed. Accordingly, when electric power is supplied from the drive circuit 52 to the steering motor 32 in accordance with the control signal Mt, the steered wheels 3 are steered to the steered angle θi in accordance with the target steering corresponding angle θp*, at a steering speed no greater than the upper-limit speed. That is to say, the control signal generating unit 63 generates the control signal Mt such that the steering speed of the steered wheels 3 is no greater than the upper-limit speed.

(Target Steering Corresponding Angle Computing Unit 62)

Next, the computation processing of the target steering corresponding angle θp* by the target steering corresponding angle computing unit 62 will be described later.

The target steering corresponding angle computing unit 62 executes low sensitivity determination processing for determining whether or not a low sensitivity condition is satisfied, and prohibition determination processing for determining whether or not a prohibition condition is satisfied. The low sensitivity condition is a condition used to determine whether or not the vehicle is in a situation in which the amount of change in the steered angle θi relative to the amount of change in the lever inclination angle θl should be made to be small, i.e., a situation in which the angle ratio α should be made small, which will be described later. The prohibition condition is a condition used to determine whether or not the vehicle is in a situation in which making the amount of change in the steered angle θi relative to the lever inclination angle θl to be small should be prohibited, i.e., a situation in which making the angle ratio α to be small should be made prohibited.

The target steering corresponding angle computing unit 62 executes normal computation processing to compute the target steering corresponding angle θp* based on the lever inclination angle θl and the vehicle speed V, when the low sensitivity condition is not satisfied or when the prohibition condition is satisfied. On the other hand, when the low sensitivity condition is satisfied and also the prohibition condition is not satisfied, the target steering corresponding angle computing unit 62 executes low sensitivity computation processing for computing a target steering corresponding angle θp* having an absolute value that is smaller than the target steering corresponding angle θp* computed by normal computation processing, based on the lever inclination angle θl and the vehicle speed V. That is to say, when the prohibition condition is satisfied, the target steering corresponding angle computing unit 62 does not execute the low sensitivity computation processing even when the low sensitivity condition is satisfied, but rather computes the target steering corresponding angle θp* by executing normal computation processing. Note that in the following, a state in which the target steering corresponding angle computing unit 62 computes the target steering corresponding angle θp* by normal computation processing may be referred to as a normal mode, and a state in which the target steering corresponding angle θp* is computed by low sensitivity computation processing may be referred to as low sensitivity mode.

Specifically, the target steering corresponding angle computing unit 62 includes memory 62a. The memory 62a stores a normal map 81 which is normal computation information, and a low sensitivity map 82 which is low sensitivity computation information.

Figure 3A:
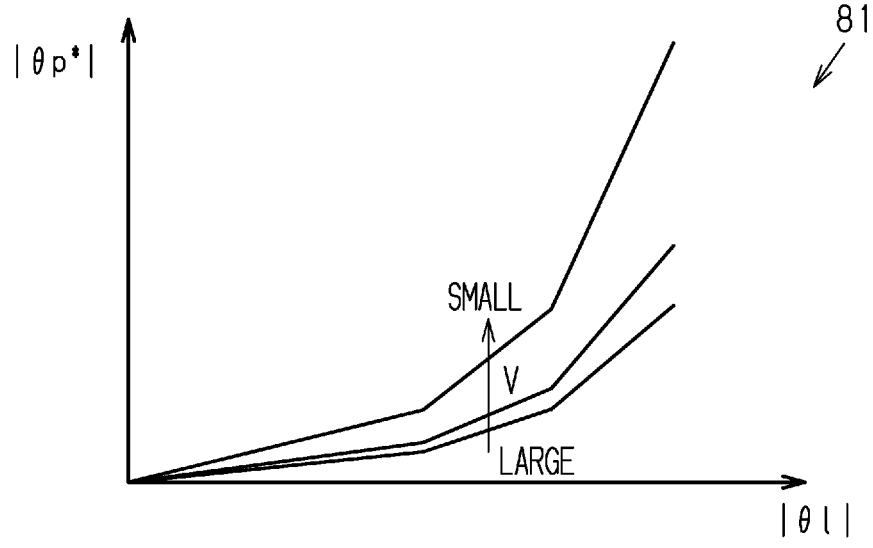
FIG. 3A is a diagram showing an example of a normal map that the steering control device in FIG. 1 has.
Figure 3B:
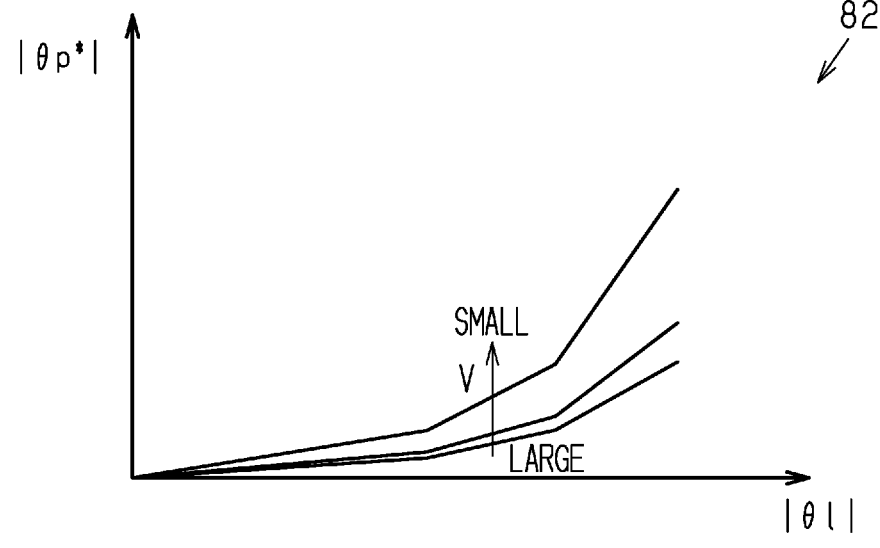
FIG. 3B is a diagram showing an example of a low sensitivity map that the steering control device in FIG. 1 has.

As shown in FIG. 3A and FIG. 3B, the normal map 81 and the low sensitivity map 82 show a relation among the lever inclination angle θl, the vehicle speed V, and the target steering corresponding angle θp*. That is to say, the normal map 81 and the low sensitivity map 82 are three-dimensional maps showing the relation of the target steering corresponding angle θp* as to the lever inclination angle θl and the vehicle speed V. In the shown example, in both the normal map 81 and the low sensitivity map 82, when the lever inclination angle θl is zero degrees, the target steering corresponding angle θp* is zero degrees. Both the normal map 81 and the low sensitivity map 82 are set such that the greater an absolute value of the lever inclination angle θl is, the greater an absolute value of the target steering corresponding angle θp* is. Also, both the normal map 81 and the low sensitivity map 82 are set such that the smaller the vehicle speed V is, the greater the absolute value of the target steering corresponding angle θp* is. The amount of change in the absolute value of the target steering corresponding angle θp* with respect to the amounts of change in the lever inclination angle θl and the vehicle speed V in the low sensitivity map 82 is set to be smaller than the amount of change in the absolute value of the target steering corresponding angle θp* with respect to the amounts of change in the lever inclination angle θl and the vehicle speed V in the normal map 81. Thus, the absolute value of the target steering corresponding angle θp* in the low sensitivity map 82 is smaller than the absolute value of the target steering corresponding angle θp* in the normal map 81, at any lever inclination angle θl and vehicle speed V, except when the absolute value of the target steering corresponding angle θp* in the normal map 81 is zero.

In normal computation processing, the target steering corresponding angle computing unit 62 computes the target steering corresponding angle θp* in accordance with the lever inclination angle θl and the vehicle speed V, by referring to the normal map 81. On the other hand, in low sensitivity computation processing, the target steering corresponding angle computing unit 62 computes the target steering corresponding angle θp* in accordance with the lever inclination angle θl and the vehicle speed V, by referring to the low sensitivity map 82. That is to say, the target steering corresponding angle computing unit 62 switches maps used in normal computation processing and in low sensitivity computation processing. Thus, the target steering corresponding angle computing unit 62 computes, in the low sensitivity computation processing, a target steering corresponding angle θp* having a smaller absolute value than the target steering corresponding angle θp* computed in the normal computation processing.

When the prohibition condition is not satisfied and the low sensitivity condition is satisfied, the target steering corresponding angle computing unit 62 outputs, to the guard processing unit 72 and the aforementioned notification unit 37, a mode signal Sm indicating that the mode is the low sensitivity mode. That is to say, the target steering corresponding angle computing unit 62 executes notification processing. This mode signal Sm is configured to cause the notification unit 37 to perform a notification operation that the target steering corresponding angle computing unit 62 is in the low sensitivity mode. On the other hand, when the prohibition condition is satisfied, or when the low sensitivity condition is not satisfied, the target steering corresponding angle computing unit 62 outputs a mode signal Sm indicating that the mode is the normal mode to the guard processing unit 72 and the notification unit 37. This mode signal Sm is configured to cause the notification unit 37 to perform a notification operation that the target steering corresponding angle computing unit 62 is in the normal mode. That is to say, the target steering corresponding angle computing unit 62 is equivalent to a notification control unit.

Next, the low sensitivity condition and the prohibition condition will be described.

The target steering corresponding angle computing unit 62 determines that the low sensitivity condition is satisfied when at least one of the following conditions is satisfied.

(a1) The vehicle speed V is no lower than a high-speed determination threshold value Vth, and the absolute value of the lever inclination angle θ1 is no greater than a straight travel determination threshold value θlth.

(a2) The vehicle speed V is no lower than the high-speed determination threshold value Vth, and an absolute value of the lateral acceleration GY is no greater than a turning determination threshold value GYth.

(a3) The vehicle speed V is no lower than the high-speed determination threshold value Vth, and an absolute value of the up-down acceleration GZ is no greater than an inclination determination threshold value GZth.

(a4) The sensitivity switch 14 is in the on state.

(a5) The shift position of the shift lever is the reverse position R.

Note that the high-speed determination threshold value Vth is a vehicle speed V at which determination can be made that the vehicle is traveling at a high speed, and is set in advance. The straight travel determination threshold value θlth is a lever inclination angle θ1 at which determination can be made that the operating lever 11 is not tilted, and is set in advance. The turning determination threshold value GYth is a lateral acceleration GY at which determination can be made that the vehicle is not making a large turn, and is set in advance. The inclination determination threshold value GZth is an up-down acceleration GZ at which determination can be made that the vehicle is traveling on a banked road, and is set in advance to a negative value.

As shown in (a1) to (a3), the low sensitivity condition includes conditions based on results of comparison in magnitude with threshold values of traveling parameters indicating the traveling state of the vehicle. In (a1) to (a3), the vehicle speed V, the lateral acceleration GY, and the up-down acceleration GZ are traveling parameters. As shown in (a4), the low sensitivity condition includes conditions based on the on/off state of the sensitivity switch 14. As shown in (a5), the low sensitivity condition includes the condition that the vehicle is traveling in reverse.

The target steering corresponding angle computing unit 62 determines that the prohibition condition is satisfied when the following condition is satisfied. (b1) An operating speed ωl of the operating lever 11 is no smaller than a sudden operation determination threshold value ωlth.

The sudden operation determination threshold value ωlth is an operating speed ωl at which determination can be made that the driver is performing a sudden operation of the operating lever 11, and is set in advance. The target steering corresponding angle computing unit 62 according to the present embodiment computes the operating speed ωl by differentiation of the lever inclination angle θ1. In another embodiment, the operation unit 4 may be configured including a speed sensor, and the operating speed ωl may be input from the speed sensor.

Next, an example of processing procedures in which the target steering corresponding angle computing unit 62 computes the target steering corresponding angle θp* will be described in accordance with the flowchart shown in FIG. 4.

As shown in the Figure, upon acquiring various types of state variables (step 101), the target steering corresponding angle computing unit 62 computes the operating speed ωl of the operating lever 11 (step 102). Subsequently, the target steering corresponding angle computing unit 62 determines whether or not the operating speed ωl is no smaller than the sudden operation determination threshold value ωlth (step 103). When the operating speed ωl is no smaller than the sudden operation determination threshold value ωlth (step 103: YES), the target steering corresponding angle θp* is computed using the normal map 81 (step 104). The mode signal Sm indicating that the mode is the normal mode is then output (step 105), and the processing ends. The processing in step 103 is equivalent to prohibition determination processing, the processing in step 104 corresponds to normal computation processing, and the processing in step 105 is equivalent to notification processing.

On the other hand, when the operating speed ωl is smaller than the sudden operation determination threshold value ωlth (step 103: NO), the target steering corresponding angle computing unit 62 determines whether or not the sensitivity switch 14 is in the on state (step 106). When the sensitivity switch 14 is in the on state (step 106: YES), the target steering corresponding angle θp* is computed using the low sensitivity map 82 (step 107). The mode signal Sm indicating that the mode is the low sensitivity mode is then output (step 108), and the processing ends. The processing in step 107 is equivalent to low sensitivity computation processing, and the processing in step 108 corresponds to notification processing.

When the sensitivity switch 14 is in the OFF state (step 106: NO), the target steering corresponding angle computing unit 62 determines whether or not the position signal Sp indicates the reverse position R (step 109). When the position signal Sp indicates the reverse position R (step 109: YES), the processing transitions to steps 107 and 108, and corresponding processing is performed.

When the position signal Sp does not indicate the reverse position R (step 109: NO), the target steering corresponding angle computing unit 62 determines whether or not the vehicle speed Vis no smaller than the high-speed determination threshold value Vth (step 110). When the vehicle speed V no smaller than the high-speed determination threshold value Vth (step 110: YES), determination is made regarding whether or not the absolute value of the lever inclination angle θ1 is no greater than the straight travel determination threshold value θlth (step 111). When the absolute value of the lever inclination angle θ1 is greater than the straight travel determination threshold value θlth (step 111: NO), determination is made regarding whether or not the absolute value of the lateral acceleration GY is no greater than the turning determination threshold value GYth (step 112). When the absolute value of the lateral acceleration GY is greater than the turning determination threshold value GYth (step 112: NO), determination is made regarding whether the up-down acceleration GZ is no greater than a negative inclination determination threshold value GZth (step 113). When the up-down acceleration GZ is greater than the negative inclination determination threshold value GZth (step 113: NO), the processing transitions to steps 104 and 105, and corresponding processing is performed. Also, when the vehicle speed V is smaller than the high-speed determination threshold value Vth (step 110: NO), the processing transitions to steps 104 and 105 in the same way, and corresponding processing is performed.

When the absolute value of the lever inclination angle θ1 is no greater than the straight travel determination threshold value θlth (step 111: YES), the target steering corresponding angle computing unit 62 transitions to steps 107 and 108, and performs the corresponding processing. Also, when the absolute value of the lateral acceleration GY is no greater than the turning determination threshold value GYth (step 112: YES), or when the up-down acceleration GZ is no greater than the negative inclination determination threshold value GZth (step 113: YES), the processing transitions to steps 107 and 108 in the same way, and corresponding processing is performed. The processing from step 109 to step 113 is equivalent to low sensitivity determination processing.

(Guard Processing Unit 72)

Next, guard processing of the difference $\Delta\theta p$ by the guard processing unit 72 will be described.

As illustrated in FIG. 2, the guard processing unit 72 executes upper-limit speed computation processing for setting an upper-limit speed for the steered wheels 3. Also, the guard processing unit 72 executes difference upper-limit computation processing of computing a difference upper-limit value $\Delta\theta$lim in accordance with the upper-limit speed, and guard processing of limiting the difference $\Delta\theta p$ based on comparison in magnitude between the difference $\Delta\theta p$ and the difference upper-limit value $\Delta\theta$lim.

The guard processing unit 72 according to the present embodiment computes the upper-limit speed according to the traveling state of the vehicle and the operation state of the operating lever 11 in the upper-limit speed computation processing. Specifically, even when the lever inclination angle $\theta 1$ remains constant, the target steering corresponding angle $\theta p^*$ may change due to change in the mode of the target steering corresponding angle computing unit 62. In light of this situation, based on the vehicle speed V, the guard processing unit 72 separately computes a transitioning upper-limit speed that is an upper-limit speed when transitioning from the normal mode to the low sensitivity mode, and a resuming upper-limit speed that is the upper-limit speed when resuming the normal mode from the low sensitivity mode. That is to say, the transitioning upper-limit speed and the resuming upper-limit speed are separately set. Based on the mode signal Sm, the guard processing unit 72 determines whether the normal mode has been switched to the low sensitivity mode, or the low sensitivity mode has been switched to the normal mode.

The guard processing unit 72 separately computes, based on the vehicle speed V, a turning upper-limit speed that is the upper-limit speed when performing a turning operation, and a returning upper-limit speed that is the upper-limit speed when performing a returning operation. That is to say, the turning upper-limit speed and the returning upper-limit speed are separately set. The turning operation is an operation in which the absolute value of the lever inclination angle $\theta 1$ increases, and the returning operation is an operation in which the absolute value of the lever inclination angle $\theta 1$ decreases. The guard processing unit 72 according to the present embodiment determines whether a turning operation is being performed or a returning operation is being performed, based on the amount of change in the absolute value of the lever inclination angle $\theta 1$. In another embodiment, the guard processing unit 72 may determine whether a turning operation is being performed or a returning operation is being performed based on the amount of change in the absolute value of the steering corresponding angle $\theta p$.

Further, the guard processing unit 72 computes a general-purpose upper-limit speed that is the upper-limit speed for when other than the above. When determining that the normal mode has been switched to the low sensitivity mode, the guard processing unit 72 computes a transitioning upper-limit speed based on the vehicle speed V. The guard processing unit 72 according to the present embodiment performs computation such that the greater the vehicle speed V is, the smaller the transitioning upper-limit speed is, but may also perform computation such that the greater the vehicle speed V is, the greater the transitioning upper-limit speed is. For example, the guard processing unit 72 is provided with a map or a function expression indicating the relation between the vehicle speed V and the transitioning upper-limit speed, and computes the transitioning upper-limit speed in accordance with the vehicle speed V by referring to the map or the function expression.

When determining that the low sensitivity mode has been switched to the normal mode, the guard processing unit 72 computes a resuming upper-limit speed based on the vehicle speed V. The guard processing unit 72 according to the present embodiment performs computation such that the greater the vehicle speed Vis, the smaller the resuming upper-limit speed is, but may also perform computation such that the greater the vehicle speed V is, the greater the resuming upper-limit speed is. Also, at the same vehicle speed V, the guard processing unit 72 may set the resuming upper-limit speed to a greater value than the transitioning upper-limit speed, or to a smaller value. The guard processing unit 72 then computes the resuming upper-limit speed using a map or a function expression, in the same way as when computing the transitioning upper-limit speed.

When determining that a turning operation is being performed, the guard processing unit 72 computes a turning upper-limit speed based on the vehicle speed V. The guard processing unit 72 according to the present embodiment performs computation such that the greater the vehicle speed Vis, the smaller the turning upper-limit speed is, but may also perform computation such that the greater the vehicle speed V is, the greater the turning upper-limit speed is. The guard processing unit 72 computes the turning upper-limit speed using a map or a function expression, in the same way as when computing the transitioning upper-limit speed.

When determining that a returning operation is being performed, the guard processing unit 72 computes a returning upper-limit speed based on the vehicle speed V. The guard processing unit 72 according to the present embodiment performs computation such that the greater the vehicle speed V is, the smaller the returning upper-limit speed is, but may also perform computation such that the greater the vehicle speed V is, the greater the returning upper-limit speed is. Also, at the same vehicle speed V, the guard processing unit 72 may set the returning upper-limit speed to a greater value than the turning upper-limit speed, or to a smaller value. The guard processing unit 72 computes the returning upper-limit speed in the same way as when computing the transitioning upper-limit speed.

When determining that the mode of the target steering corresponding angle computing unit 62 is maintained, and also that neither the turning operation nor the returning operation is being performed, the guard processing unit 72 computes a general-purpose upper-limit speed based on the vehicle speed V. The guard processing unit 72 according to the present embodiment sets the general-purpose upper-limit speed to be smaller the greater the vehicle speed V is, but may set the general-purpose upper-limit speed to be greater the greater the vehicle speed V is. The guard processing unit 72 computes the general-purpose upper-limit speed in the same way as when computing the transitioning upper-limit speed.

The guard processing unit 72 then, in the difference upper-limit computation processing, computes a difference upper-limit value $\Delta\theta$lim corresponding to the computed upper-limit speed, i.e., the transitioning upper-limit speed, the resuming upper-limit speed, the turning upper-limit speed, the returning upper-limit speed, or the general-purpose upper-limit speed. For example, the guard processing unit 72 is provided with a map or a function expression indicating the relation between the upper-limit speed and the difference upper-limit value $\Delta\theta$lim, and computes the difference upper-limit value $\Delta\theta$lim in accordance with the upper-limit speed that is computed, by referring to the map or the function expression.

In the guard processing, the guard processing unit 72 performs a comparison in magnitude of the absolute value of the difference $\Delta\theta$p that is input, and the difference upper-limit value $\Delta\theta$lim that is computed. When the absolute value of the difference $\Delta\theta$p is no greater than the difference upper-limit value $\Delta\theta$lim, the guard processing unit 72 outputs the difference 40p that is input, as it is, to the F/B control unit 73 as the difference $\Delta\theta$ pg following guard processing. On the other hand, when the absolute value of the difference $\Delta\theta$p is greater than the difference upper-limit value $\Delta\theta$lim, the guard processing unit 72 maintains the sign of the difference $\Delta\theta$p that is input, and also outputs a value, of which the absolute value is equal to the difference upper-limit value $\Delta\theta$lim, to the F/B control unit 73 as the difference $\Delta\theta$pg following guard processing.

The guard processing unit 72 of the present embodiment performs guard processing using a difference upper-limit value $\Delta\theta$lim in accordance with the transitioning upper-limit speed when the normal mode changes to the low sensitivity mode while the turning operation or the returning operation is being performed. However, in another embodiment, in such a case, guard processing may be performed using a difference upper-limit value $\Delta\theta$lim in accordance with the turning upper-limit speed or the returning upper-limit speed. Also, the guard processing unit 72 of the present embodiment performs guard processing using a difference upper-limit value $\Delta\theta$lim in accordance with the resuming upper-limit speed when the low sensitivity mode changes to the normal mode while the turning operation or the returning operation is being performed. However, in another embodiment, in such a case, guard processing may be performed using a difference upper-limit value $\Delta\theta$lim in accordance with the turning upper-limit speed or the returning upper-limit speed.

Next, an example of processing procedures in which the guard processing unit 72 performs guard processing on the difference $\Delta\theta$p will be described according to the flowcharts shown in FIG. 5 and FIG. 6.

Figure 5:
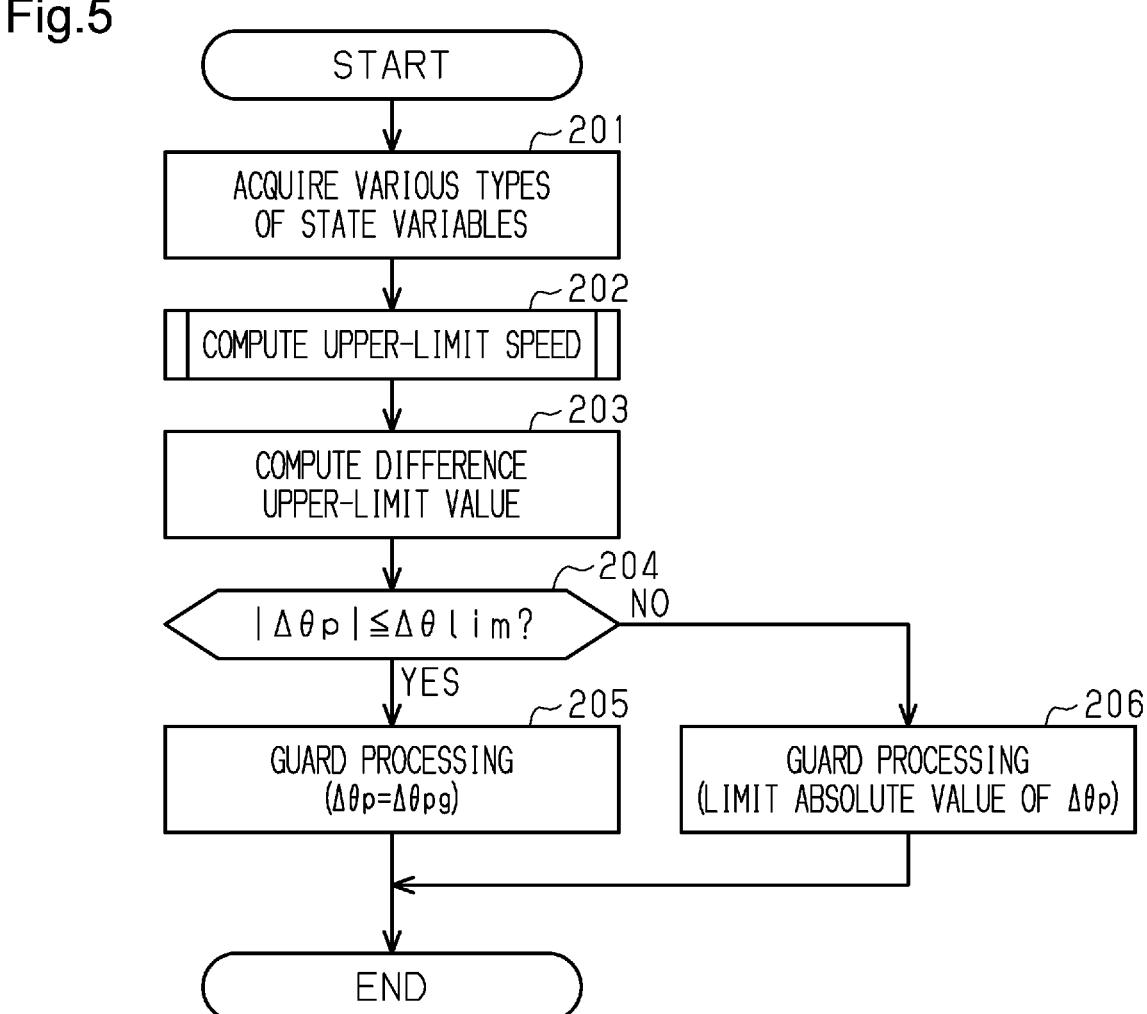
FIG. 5 is a flowchart showing an example of processing procedures of guard processing performed by a guard processing unit of the steering control device in FIG. 1.

As shown in FIG. 5, upon acquiring various types of state variables (step 201), the guard processing unit 72 computes the upper-limit speed (step 202). Computation of the upper-limit speed is performed according to the flowchart shown in FIG. 6. The processing in step 202 is equivalent to upper-limit speed computation processing.

Figure 6:
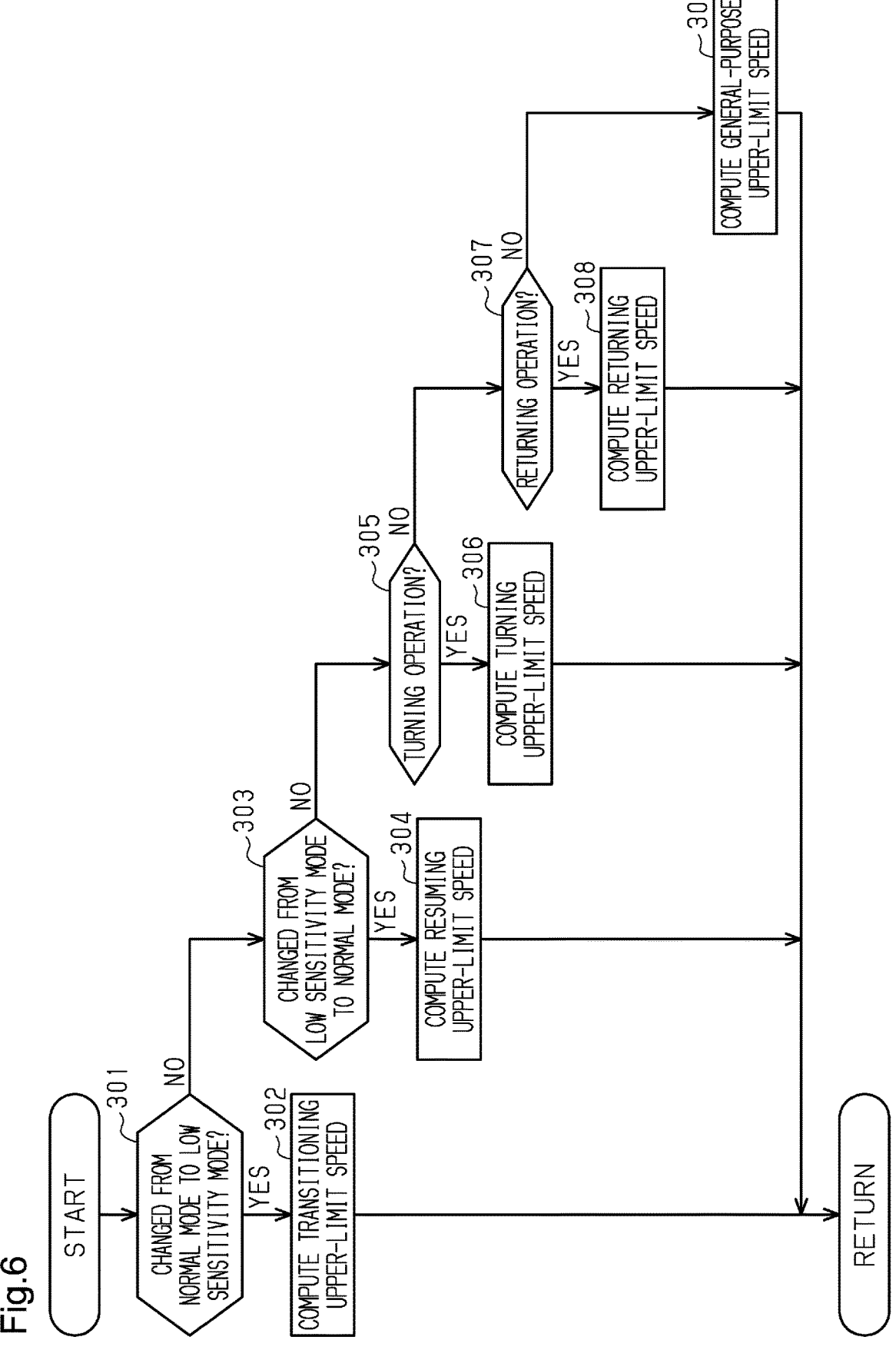
FIG. 6 is a flowchart showing an example of processing procedures of upper-limit speed computation performed by the guard processing unit of the steering control device in FIG. 1.

As shown in FIG. 6, the guard processing unit 72 determines whether or not the normal mode has changed to the low sensitivity mode, based on the mode signal Sm (step 301). When the normal mode has changed to the low sensitivity mode (step 301: YES), a transitioning upper-limit speed is computed based on the vehicle speed V (step 302).

When the normal mode has not changed to the low sensitivity mode (step 301: NO), the guard processing unit 72 determines whether or not the low sensitivity mode has changed to the normal mode (step 303). When the low sensitivity mode has changed to the normal mode (step 303: YES), a resuming upper-limit speed is computed based on the vehicle speed V (step 304).

When the low sensitivity mode has not changed to the normal mode (step 303: NO), the guard processing unit 72 determines whether or not a turning operation is being performed based on change in the absolute value of the lever inclination angle $\theta$1 (step 305). When a turning operation is being performed (step 305: YES), a turning upper-limit speed is computed based on the vehicle speed V (step 306).

When a turning operation is not being performed (step 305: NO), the guard processing unit 72 determines whether or not a returning operation is being performed (step 307). When a returning operation is being performed (step 307: YES), a returning upper-limit speed is computed based on the vehicle speed V (step 308). On the other hand, when a returning operation is not performed (step 307: NO), a general-purpose upper-limit speed is computed based on the vehicle speed V (step 309).

Returning to FIG. 5, following computing the upper-limit speed in step 202, the guard processing unit 72 computes a difference upper-limit value $\Delta\theta$lim corresponding to the upper-limit speed that is computed (step 203). The processing in step 203 is equivalent to difference upper-limit value computation processing.

Subsequently, determination is made regarding whether or not the absolute value of the difference $\Delta\theta$p acquired in step 201 is no greater than the difference upper-limit value $\Delta\theta$lim (step 204). When the absolute value of the difference $\Delta\theta$p is no greater than the difference upper-limit value $\Delta\theta$lim (step 204: YES), the difference 40p is output, as it is, as the difference $\Delta\theta$pg following guard processing (step 205), and the processing ends. On the other hand, when the absolute value of the difference $\Delta\theta$p is greater than the difference upper-limit value $\Delta\theta$lim (step 204: NO), the sign of the difference $\Delta\theta$p that is acquired is maintained, and also a value in which the absolute value is set to be equal to the difference upper-limit value $\Delta\theta$lim is output as the difference $\Delta\theta$ pg following guard processing (step 206), and the processing ends. The processing in steps 205 and 206 is equivalent to guard processing.

Next, the effects and advantages of the present embodiment will be described.

(1) When the low sensitivity condition is satisfied, the target steering corresponding angle computing unit 62 executes low sensitivity computation processing, in which a target steering corresponding angle $\theta$p* having a smaller absolute value than that of a target steering corresponding angle $\theta$p* computed by normal computation processing is computed based on the lever inclination angle $\theta$1. Accordingly, when the low sensitivity condition is satisfied, the target steering corresponding angle $\theta$p* is computed to be smaller than usual. Thus, the angle ratio $\alpha$ becomes smaller, and accordingly operations for finely adjusting the steered angle $\theta$i of the steered wheels 3 are facilitated. Making fine adjustment of the steered angle $\theta$i to be easier in this way facilitates operations to prevent lane departure of the vehicle when traveling straight, or operations for when driving on a banked road that gently curves, for example.

(2) The target steering corresponding angle computing unit 62 determines whether or not the low sensitivity condition is satisfied, based on the results of comparison in magnitude between the traveling parameters indicating the traveling state of the vehicle and threshold values. Accordingly, the angle ratio $\alpha$ can be appropriately reduced in accordance with the traveling state of the vehicle.

(3) The steering device 2 has the sensitivity switch 14 that is operated by the driver. The target steering corresponding angle computing unit 62 determines whether or not the low sensitivity condition is satisfied, based on the on/off state of the sensitivity switch 14. Accordingly, the angle ratio $\alpha$ can be reduced in accordance with the intent of the driver.

(4) The target steering corresponding angle computing unit 62 determines that the low sensitivity condition is satisfied on condition that the vehicle is traveling in reverse. Thus, the angle ratio α becomes smaller while the vehicle is traveling in reverse, and accordingly the behavior of the vehicle becomes less likely to be irregular while traveling in reverse.

(5) The target steering corresponding angle computing unit 62 further executes prohibition determination processing to determine whether or not a prohibition condition is satisfied, and when the prohibition condition is satisfied, executes normal computation processing without executing low sensitivity computation processing, even when the low sensitivity condition is satisfied. Accordingly, when the prohibition condition is satisfied, the angle ratio α does not become small, and the steered wheels 3 can be steered more greatly. Thus, when avoiding an obstruction ahead of the vehicle, for example, the steered wheels 3 can be smoothly steered.

(6) The target steering corresponding angle computing unit 62 determines whether or not the prohibition condition is satisfied, based on whether or not an operating speed ωl of the operating lever 11 is no smaller than a sudden operation determination threshold value ωlth. In many cases, quick operations are performed to avoid obstructions. Accordingly, when avoiding an obstruction, for example, reducing the angle ratio α can be appropriately prohibited.

(7) The target steering corresponding angle computing unit 62 includes the memory 62a. The memory 62a stores the normal map 81 and the low sensitivity map 82 indicating the relation between the lever inclination angle θ1 and the target steering corresponding angle θp*. The amount of change in the absolute value of the target steering corresponding angle θp* with respect to the amount of change in the lever inclination angle θ1 and the vehicle speed V in the low sensitivity map 82 is set to be smaller than that in the normal map 81. The normal computation processing is processing that uses the normal map 81 to compute the target steering corresponding angle θp* based on the lever inclination angle θ1. The low sensitivity computation processing is processing that uses the low sensitivity map 82 to compute the target steering corresponding angle θp* based on the lever inclination angle θ1. That is to say, the target steering corresponding angle computing unit 62 switches maps used in normal computation processing and in low sensitivity computation processing. Accordingly, the target steering corresponding angle computing unit 62 can easily compute a target steering corresponding angle θp* having an absolute value smaller than the target steering corresponding angle θp* computed by normal computation processing in the low sensitivity mode.

(8) The control signal generating unit 63 generates the control signal Mt such that the steering speed of the steered wheels 3 is controlled to be no greater than the upper-limit speed. Thus, sudden changes in the steered angle θi are suppressed, and accordingly irregularity in the behavior of the vehicle can be suppressed.

(9) The control signal generating unit 63 includes the subtractor 71 that computes the difference between the steering corresponding angle θp and the target steering corresponding angle θp*, the guard processing unit 72 that limits the absolute value of the difference Δθp so as to be no greater than the difference upper-limit value Δθlim in accordance with the upper-limit speed, and the F/B control unit 73 that generates a control signal Mt based on the difference following guard processing. According to the above configuration, limiting the absolute value of the difference Δθp to be no greater than the difference upper-limit value Δθlim is sufficient, and accordingly the computation load for setting the steering speed of the steered wheels 3 to be no greater than the upper-limit speed can be reduced, as compared to when speed F/B control is executed, for example.

(10) The guard processing unit 72 executes upper-limit speed computation processing in which the upper-limit speed is computed based on the vehicle speed V. Now, the tendency of the vehicle behavior to be irregular differs in accordance with the vehicle speed V, even at the same steering speed. That is to say, the higher the vehicle speed Vis, the more readily the behavior of the vehicle becomes irregular. With regard to this point, according to the above configuration, an appropriate upper-limit speed can be set in accordance with the vehicle speed V.

(11) The guard processing unit 72 separately sets the transitioning upper-limit speed and the resuming upper-limit speed. Accordingly, the steering of the steered wheels 3 due to the target steering corresponding angle computing unit 62 switching to the normal mode or the low sensitivity mode can be performed at an appropriate steering speed.

(12) The guard processing unit 72 separately sets the turning upper-limit speed and the returning upper-limit speed. Accordingly, the steered wheels 3 can be steered at an appropriate steering speed in accordance with whether a turning operation or a returning operation.

(13) A notification unit 37 is connected to the steering control device 1. When in the low sensitivity mode, the target steering corresponding angle computing unit 62 makes notification thereof through the notification unit 37. Accordingly, the driver can easily recognize whether or not the mode is the low sensitivity mode, i.e., whether or not the angle ratio α is small.

The present embodiment can be carried out modified as follows. The present embodiment and the following modifications can be combined and carried out insofar as no technical contradiction arises.

Although the guard processing unit 72 has been described as computing the turning upper-limit speed and the returning upper-limit speed separately, an arrangement may be made in which no distinction is made between the turning operation and the returning operation, and a single upper-limit speed is computed as the upper-limit speed when operating the operating lever 11. Also, although the guard processing unit 72 has been described as separately setting the transitioning upper-limit speed and the resuming upper-limit speed, a single upper-limit speed may be computed as the upper-limit speed when changing the mode. Further, just the general-purpose upper-limit speed may be computed as the upper-limit speed, regardless of the traveling state of the vehicle and the operation state of the operating lever 11.

At least one of the transitioning upper-limit speed, the resuming upper-limit speed, the turning upper-limit speed, the returning upper-limit speed, and the general-purpose upper-limit speed, may be a fixed value that is set in advance, rather than a value computed by the guard processing unit 72 based on the vehicle speed V.

The control signal generating unit 63 has been described as generating a control signal Mt that makes the steering speed of the steered wheels 3 to be no higher than the upper-limit speed by limiting the absolute value of the difference $\Delta\theta p$ to no greater than the difference upper-limit value $\Delta\theta \text{lim}$. However, this is not restrictive, and a control signal Mt that makes the steering speed of the steered wheels 3 to be no greater than the upper-limit speed may be generated by executing speed feedback control. Further, the control signal generating unit 63 may generate the control signal Mt without taking the steering speed of the steered wheels 3 into consideration.

The microcomputer 51 does not have to include the steering corresponding angle computing unit 61. In this case, the steering corresponding angle $\theta p$, which is the rotational angle of the pinion shaft 21, may be input from a sensor that detects this rotational angle, for example. The sensor may detect the rotational angle of the pinion shaft 21 at an absolute angle exceeding a range of 360°.

The target steering corresponding angle computing unit 62 switches the map used in the normal computation processing and in the low sensitivity computation processing, so that when the low sensitivity condition is satisfied, the target steering corresponding angle computing unit 62 computes the target steering corresponding angle $\theta p^*$ to have a smaller absolute value than the target steering corresponding angle $\theta p^*$ computed by normal computation processing. However, this is not restrictive, and an arrangement may be made in which the target steering corresponding angle $\theta p^*$ is computed to have a smaller absolute value than the target steering corresponding angle $\theta p^*$ by, for example, computing the target steering corresponding angle $\theta p^*$ using the normal map 81 in normal computation processing, and correcting the target steering corresponding angle $\theta p^*$ computed using the normal map 81 in low sensitivity computation processing. As a method of correction, for example, a predetermined value may be subtracted from the target steering corresponding angle $\theta p^*$ computed using the normal map 81, or the target steering corresponding angle $\theta p^*$ computed using the normal map 81 may be multiplied by a gain smaller than "1".

Although the target steering corresponding angle computing unit 62 has been described as being provided with a single low sensitivity map 82, this is not restrictive, and may include two or more low sensitivity maps. For example, when a first low sensitivity map and a second low sensitivity map are provided, the second low sensitivity map may be set such that the absolute value of the target steering corresponding angle $\theta p^*$ with respect to the lever inclination angle $\theta 1$ is smaller than that of the first low sensitivity map. The target steering corresponding angle computing unit 62 may be configured so as to compute the target steering corresponding angle $\theta p^*$ using the first low sensitivity map when only one of (a1) to (a5) is satisfied, for example, and to compute the target steering corresponding angle $\theta p^*$ using the second low sensitivity map when any two or more of (a1) to (a5) are satisfied.

A dead band may be set in the normal map 81 and the low sensitivity map 82. Specifically, a range may be set near zero degrees of the lever inclination angle $\theta 1$, in which the target steering corresponding angle $\theta p^*$ remains at zero degrees even when the absolute value of the lever inclination angle $\theta 1$ increases. Further, the normal map 81 and the low sensitivity map 82 may be two-dimensional maps showing the relation of the target steering corresponding angle $\theta p^*$ as to the lever inclination angle $\theta 1$. That is to say, the normal computation processing and the low sensitivity computation processing may be processing for computing the target steering corresponding angle $\theta p^*$ based only on the lever inclination angle $\theta 1$. Also, the normal computation information and the low sensitivity computation information may be, for example, function expressions instead of maps.

Although the target steering corresponding angle computing unit 62 has been described as determining the conditions (a1) to (a5) to determine whether or not the low sensitivity condition is satisfied, just at least one of these conditions may be determined. Also, other conditions may be used to determine whether or not the low sensitivity condition is satisfied.

Conditions (a1) to (a5) can be changed as appropriate. For example, in condition (a2), determination of whether or not an absolute value of yaw rate of the vehicle is no greater than the turning determination threshold value GYth may be performed, in addition to determining whether or not the absolute value of the lateral acceleration GY is no greater than the turning determination threshold value GYth. Also, the high-speed determination threshold value Vth in (a1) to (a3) may be different values from each other.

Although the target steering corresponding angle computing unit 62 has been described as determining condition (b1) in order to determine whether or not the prohibition condition is satisfied, this determination may be made using other conditions, in addition to or instead of this. Such other conditions may be, for example, that a signal indicating that the driver has performed a sudden brake operation is input. Also, the target steering corresponding angle computing unit 62 does not have to determine whether or not the prohibition condition is satisfied.

Figure 4:
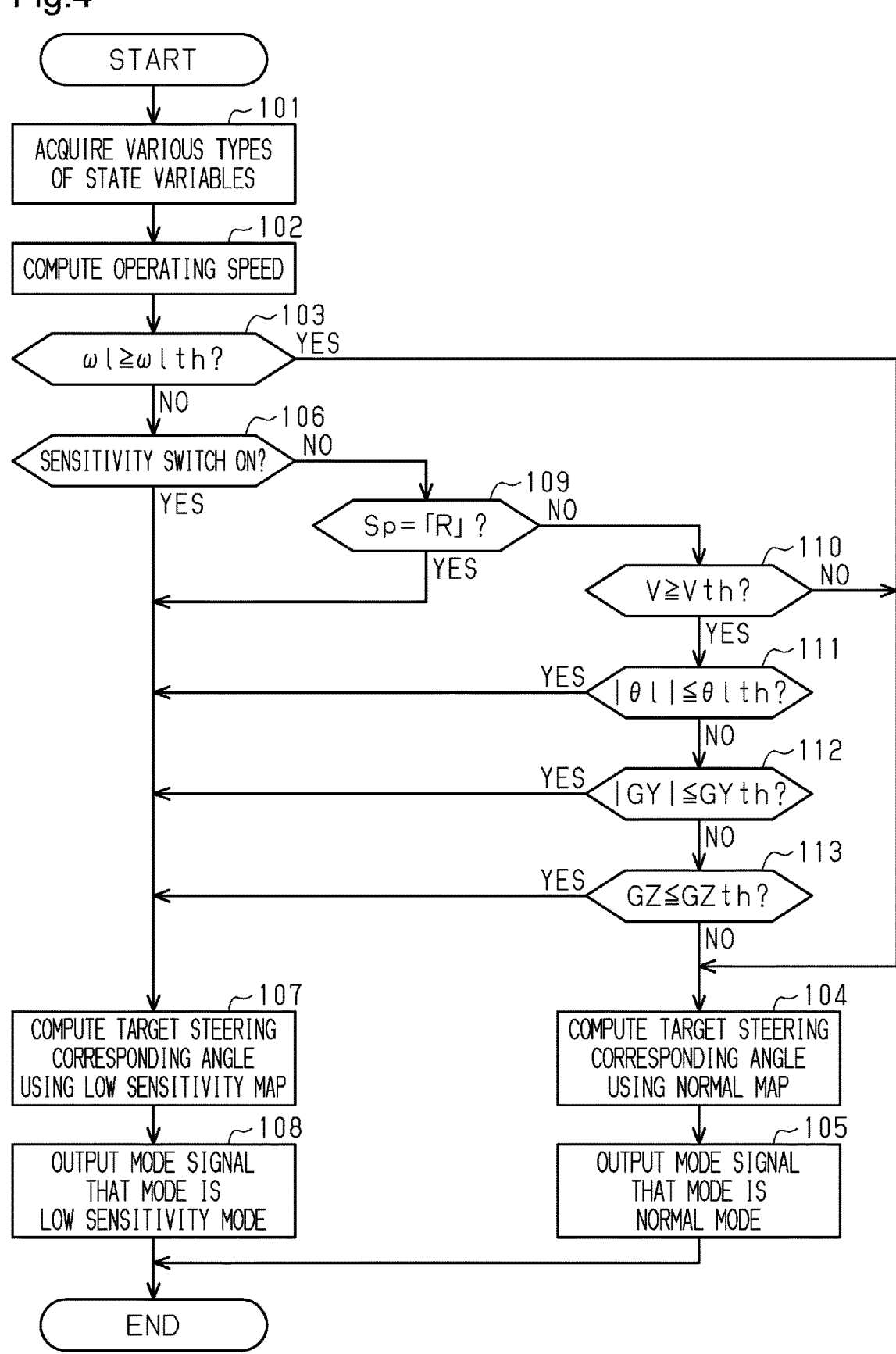
FIG. 4 is a flowchart showing an example of processing procedure for target steering corresponding angle computation by a target steering corresponding angle computing unit of the steering control device in FIG. 1.

The processing procedures performed by the target steering corresponding angle computing unit 62 are not limited to the procedures shown in FIG. 4, and can be changed as appropriate. For example, an arrangement may be made in which, following acquiring various types of state variables (step 101), the target steering corresponding angle $\theta p^*$ is immediately computed using the normal map 81 (step 104), and when the low sensitivity condition is satisfied, the target steering corresponding angle $\theta p^*$ that is computed may be changed to a value based on the low sensitivity map 82. Similarly, the processing procedures performed by the guard processing unit 72 are not limited to the procedures shown in FIG. 5 and FIG. 6, and can be changed as appropriate.

In the above embodiment, the convertible value that can be converted into the steered angle $\theta i$ of the steered wheels 3 has been described as being the rotational angle of the pinion shaft 21, but this is not restrictive, and for example, a stroke amount of the rack shaft 22, or the steered angle $\theta i$ itself, may be the convertible value.

The sensitivity switch 14 may be a type of switch that is switches to the on state only while being pressed by the driver. Also, the sensitivity switch 14 may be a dial-type multi-stage switch that can be switched among three or more states. Such a multi-stage switch is suitably used when the target steering corresponding angle computing unit 62 includes a plurality of low sensitivity maps. Further, the steering device 2 does not have to include the sensitivity switch 14.

The microcomputer 51 may separately include a notification control unit that performs determination of the low sensitivity condition and the prohibition condition, similar to the target steering corresponding angle computing unit 62, with this notification control unit making notification of the low sensitivity mode through the notification unit 37. Also, the microcomputer 51 does not have to make notification of the low sensitivity mode.

Although the operating lever 11 has been described as being tiltably supported by the base 12, this is not restrictive, and may be supported slidably relative to the base 12, for example. In this case, the amount of operation by the driver is represented by the amount of sliding of the operating lever 11. In addition to controlling the steered angle θi of the steered wheels 3, the operating lever 11 may be used to control driving/braking of the vehicle.

The operation unit 4 may include a motor and/or a spring that applies a reaction force to the operating lever 11 in response to the operations performed by the driver. In a configuration in which the reaction force is applied by a motor, the lever inclination angle θ1 may be detected based on the rotational angle of the motor. Further, the operation unit 4 may include, in addition to the operating lever 11, a steering wheel operated by the driver. The steering device 2 has been described as having a linkless structure in which power transmission between the operation unit 4 and the steering unit 5 is separated, but this is not restrictive, the structure of the steering device 2 may be such that power transmission between the operation unit 4 and the steering unit 5 can be separated by a clutch when a steering wheel is provided.

Although the steering actuator 31 has been described as transmitting the rotation of the steering motor 32 to the ball screw mechanism 35 via the belt mechanism 34, this is not restrictive, and for example, the steering actuator 31 may be configured such that the rotation of the steering motor 32 is transmitted to the ball screw mechanism 35 via a gear mechanism. Also, the steering actuator 31 may be configured such that the steering motor 32 directly rotates the ball screw mechanism 35. Further, the steering unit 5 may be configured including a second rack and pinion mechanism, and the steering actuator 31 may be configured such that the rotation of the steering motor 32 is converted into a reciprocating motion of the rack shaft 22 by the second rack and pinion mechanism, thereby applying steering force to the steering unit 5.

Next, technical ideas that can be comprehended from the above embodiment and modifications will be additionally described below.

(a) The low sensitivity condition may include a straight travel condition including that the vehicle speed, which is a travelling parameter, is no smaller than a high-speed determination threshold value, and that the absolute value of the amount of operation is no greater than a straight travel determination operation amount.

(b) The low sensitivity condition may include a turning condition including that the vehicle speed, which is a traveling parameter, is no smaller than the high-speed determination threshold value, and that an absolute value of the yaw rate or lateral acceleration of the vehicle, which are traveling parameters, is no greater than the turning determination threshold value.

(c) The up-down acceleration of the vehicle may be detected as the positive value for the upward-direction acceleration and the negative value for the downward-direction acceleration, and the low sensitivity condition may include inclined road conditions including that the vehicle speed, which is a traveling parameter, is no smaller than a high-speed determination threshold value, and that the up-down acceleration, which is a traveling parameter, is no greater than the negative inclination determination threshold value.

The invention claimed is:

1. A steering control device that controls a steering device of a vehicle, wherein:

the steering device has a structure in which a power transmission path between an operation unit having an operating lever and a steering unit configured to steer a steered wheel is separated;

the steering control device includes a target steering corresponding value computing unit configured to compute a target steering corresponding value that is a target value of a convertible value that can be converted into a steered angle of the steered wheel, and a control signal generating unit configured to generate a control signal for actuation of the steering unit, based on the target steering corresponding value;

the target steering corresponding value computing unit is configured to execute low sensitivity determination processing for determining whether or not a low sensitivity condition for reducing an amount of change in the steered angle with respect to an amount of change in an amount of operation of the operating lever is satisfied, normal computation processing for computing the target steering corresponding value based on the amount of operation when the low sensitivity condition is not satisfied, and low sensitivity computation processing for computing, based on the amount of operation, the target steering corresponding value having a smaller absolute value than the target steering corresponding value computed by the normal computation processing, when the low sensitivity condition is satisfied; and the target steering corresponding value computing unit is configured to further execute prohibition determination processing for determining whether or not a prohibition condition for prohibiting reduction in the amount of change in the steered angle with respect to the amount of change in the amount of operation is satisfied, and execute the normal computation processing without executing the low sensitivity computation processing when the prohibition condition is satisfied, even when the low sensitivity condition is satisfied.

2. The steering control device according to claim 1, wherein the low sensitivity condition includes a condition based on a result of comparison in magnitude between a traveling parameter indicating a traveling state of the vehicle and a threshold value.

3. The steering control device according to claim 1, wherein:

the steering device has a sensitivity switch that is configured to be operated by a driver; and the low sensitivity condition includes a condition based on an on/off state of the sensitivity switch.

4. The steering control device according to claim 1, wherein the low sensitivity condition includes a condition including thatthe vehicle is traveling in reverse.

5. The steering control device according to claim 1, wherein the prohibition condition includes a condition including that an operating speed of the operating lever is greater than a sudden operation determination threshold value.

6. The steering control device according to claim 1, wherein:

the target steering corresponding value computing unit includes memory;

the memory stores normal computation information and low sensitivity computation information indicating a relation between the amount of operation and the target steering corresponding value;

an amount of change of an absolute value of the target steering corresponding value with respect to the amount of change in the amount of operation in the low sensitivity computation information is set to be smaller than that in the normal computation information;

the normal computation processing is processing of computing the target steering corresponding value based on the amount of operation, using the normal computation information; and the low sensitivity computation processing is processing of computing the target steering corresponding value based on the amount of operation, using the low sensitivity computation information.

7. The steering control device according to claim 1, wherein the control signal generating unit is configured to generate the control signal that controls a steering speed of the steered wheel to be no greater than an upper-limit speed.

8. The steering control device according to claim 7, wherein the control signal generating unit includes a subtractor configured to compute a difference between a steering corresponding value that is an actual value of the convertible value, and the target steering corresponding value, a guard processing unit configured to execute guard processing to limit an absolute value of the difference to be no greater than a difference upper-limit value corresponding to the upper-limit speed, and a feedback control unit configured to generate the control signal based on the difference following the guard processing.

9. The steering control device according to claim 8, wherein the guard processing unit is configured to further execute upper-limit speed computation processing for computing the upper-limit speed based on a vehicle speed.

10. The steering control device according to claim 7, wherein:

modes of the target steering corresponding value computing unit include a normal mode in which the target steering corresponding value is computed by executing the normal computation processing, and a low sensitivity mode in which the target steering corresponding value is computed by executing the low sensitivity computation processing;

the upper-limit speed includes a transitioning upper-limit speed that is the upper-limit speed when transitioning from the normal mode to the low sensitivity mode, and a resuming upper-limit speed that is the upper-limit speed when resuming the normal mode from the low sensitivity mode; and the transitioning upper-limit speed and the resuming upper-limit speed are separately set.

11. The steering control device according to claim 7, wherein:

the upper-limit speed includes a turning upper-limit speed that is the upper-limit speed when performing a turning operation in which an absolute value of the amount of operation increases, and a returning upper-limit speed that is the upper-limit speed when performing a returning operation in which the absolute value of the amount of operation decreases; and the turning upper-limit speed and the returning upper-limit speed are separately set.

12. The steering control device according to claim 1, wherein:

a notification unit is connected to the steering control device; and the steering control device further includes a notification control unit configured to, when a mode of the target steering corresponding value computing unit is a low sensitivity mode in which the target steering corresponding value is computed by executing the low sensitivity computation processing, make notification thereof through the notification unit.

13. A steering control method for controlling a steering device of a vehicle, wherein:

the steering device has a structure in which a power transmission path between an operation unit having an operating lever and a steering unit configured to steer a steered wheel is separated;

the steering control method includes computing a target steering corresponding value that is a target value of a convertible value that can be converted into a steered angle of the steered wheel, and generating a control signal for actuation of the steering unit, based on the target steering corresponding value;

computing the target steering corresponding value includes executing low sensitivity determination processing for determining whether or not a low sensitivity condition for reducing an amount of change in the steered angle with respect to an amount of change in an amount of operation of the operating lever is satisfied, normal computation processing for computing the target steering corresponding value based on the amount of operation when the low sensitivity condition is not satisfied, and low sensitivity computation processing for computing, based on the amount of operation, the target steering corresponding value having a smaller absolute value than the target steering corresponding value computed by the normal computation processing, when the low sensitivity condition is satisfied; and computing the target steering corresponding value includes further executing prohibition determination processing for determining whether or not a prohibition condition for prohibiting reduction in the amount of change in the steered angle with respect to the amount of change in the amount of operation is satisfied, and executing the normal computation processing without executing the low sensitivity computation processing when the prohibition condition is satisfied, even when the low sensitivity condition is satisfied.

* * * * *